United States Patent Office 3,422,606
Patented Jan. 21, 1969

3,422,606
CROP CONDITIONER ATTACHMENT FOR A WINDROWER
William R. Wood, Ottumwa, Iowa, assignor to Deere & Company, Moline, Ill., a corporation of Delaware
Filed Dec. 23, 1965, Ser. No. 515,893
U.S. Cl. 56—1     9 Claims
Int. Cl. A01d 43/10, 57/30

ABSTRACT OF THE DISCLOSURE

A self-propelled windrower has a forwardly disposed platform with a crop discharge area and a hay conditioner unit suspended from the windrower behind the crop discharge area by means of mounting means which transmits the weight of the conditioner unit to the upper conditioner roll when the unit is in operating position so that the roll pressure is supplied by the weight of the unit.

---

This invention relates to a crop conditioner attachment for a windrower-type harvester and more particularly to an improved design for such a crop conditioner attachment, including improved means for mounting the attachment on the windrower.

A windrower is conventionally used to cut standing crops, such as grain or hay, and return the severed crops to the field in a windrow which is picked up in a subsequent harvesting operation after the crop has cured. A crop conditioner is used to crush or crimp the stems of previously severed crops, such as hay, to accelerate the curing of the crop and provide a more palatable and nutritious feed, the severed crop being conventionally picked up from the field, passed between a pair of crushing rolls, and returned to the field. The rolls are either smooth or fluted or a combination of the two and are conventionally biased against one another by a spring means to provide the necessary crushing pressure.

While it is known to mount a crop conditioner rearwardly of the windrow discharge in order that the crop might be cut, conditioned, and windrowed in a single operation, previous crop conditioners so mounted have utilized the conventional spring means to provide the necessary crushing roll pressure.

The general object of the present invention is to provide an improved crop conditioner for attachment to a conventional windrower, and including an improved mounting means for attaching the conditioner on the windrower. A more specific object is to provide such a crop conditioner and mounting means whereby the weight of the crop conditioner provides the crushing roll pressure and further to provide such a crop conditioner having a relatively constant crushing roll pressure regardless of the separation between the rolls.

Another object is to provide such a crop conditioner and mounting means whereby the entire conditioner unit automatically raises when slugs of material pass between the crushing rolls.

Still another object is to provide a mounting means which includes spring means for partly counterbalancing the weight of the conditioner unit to assist the raising of the unit when an obstacle is encountered.

These and other objects will become apparent from the following detailed description and accompanying drawings wherein.

Figure 1:
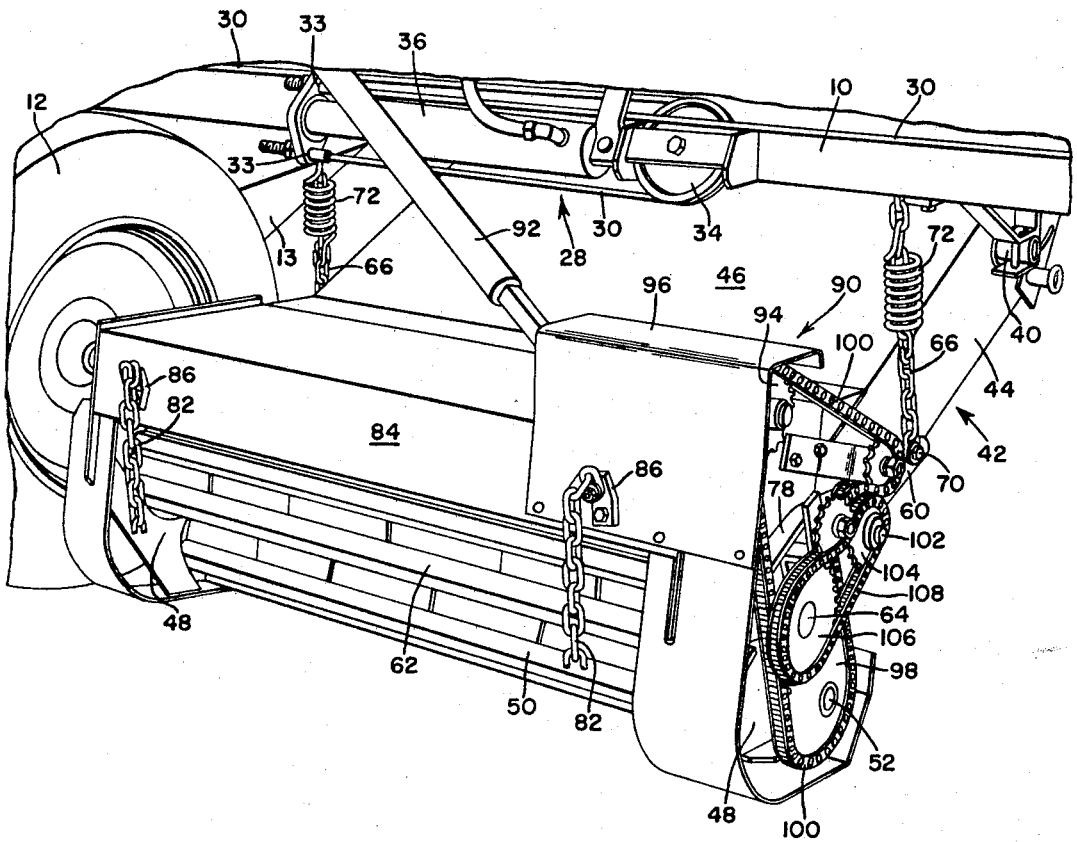
FIG. 1 is a front and side perspective view of the crop conditioner mounted on a conventional windrower, only a portion of the windrower being shown.

A typical windrower includes a main frame 10, mounted for advance over a field on front drive wheels 12 (only one of which is shown) and a rear caster wheel (not shown), the front drive wheels 12 being connected to the frame via lower frame members 13 which form a portion of the main frame 10.

A conventional platform or header, indicated generally by the numeral 14, is mounted forwardly from the frame on upper and lower fore-and-aft support arms 16 and 18 respectively, the upper support arms 16 being pivotally mounted to the frame at 20 and to the platform at 22, and the lower support arms 18 being pivotally mounted to the lower frame member 13 at 24 and to the platform 14 at 26. The support arms 16 and 18, the platform 14, and the frame 10 form a parallelogram-type linkage, whereby the platform 14 is vertically swingable on the main frame 10. The position of the platform 14 is established by a suspension control means 28, which includes a pair of cables 30 having one end attached to the lower support arms 18 at 32 and their opposite end attached at 33 to a transverse hydraulic cylinder 36 mounted on the frame and connected to a source of fluid pressure driven by a conventional power source on the windrower (not shown). One cable 30 is trained around a pulley 34 and is connected to one side of the platform, while the other cable is connected to the other side of the platform, both cables transmitting the movement of the hydraulic cylinder 36 to the platform 14.

Although the platform details are not shown, it is of conventional construction and includes a forwardly disposed mower bar and a transverse conveyor for moving the severed crops laterally to a discharge area from which the crops return to the ground, the platform preferably being a center-delivery type wherein the discharge area is centrally located to form the windrow between the drive wheels 12.

The main frame 10 carries an underlying transverse pivot 40 on which a crop conditioner frame 42 is swingably mounted for movement in a generally vertical arc. The crop conditioner frame 42 includes a pair of forwardly directed arms 44 which are approximately aligned in a fore-and-aft direction with the opposite lateral edges of the platform discharge area and are connected by a top panel 46. A generally upright fore-and-aft side panel 48 is mounted at the forward end of each arm 44 and a crop conditioner roll 50, having a transverse axial shaft 52, is journaled at opposite ends in the side panels 48. A bell crank 54 is swingably mounted intermediate its ends on a transverse pivot 56 on each side panel 48, the pivots 56 on each side panel being aligned. Although only one side of the crop conditioner is shown in the drawings, it can be appreciated that the opposite sides of the crop conditioner are substantially identical, the bell cranks 54 on the opposite sides of the crop conditioner being mirror images of one another. The bell crank pivot 56 is parallel to and upwardly from the conditioner roll 50, and each bell crank 54 includes a forwardly extending arm 58 and a rearwardly extending arm 60. A movable conditioner roll 62, having an axial shaft 64, is journaled on and mounted between the forward bell crank arms 58 closely parallel to the conditioner roll 50. While the conditioner rolls 50 and 62 are both shown as the fluted type having meshing axially extending teeth, other types of crushing rolls could also be utilized within the scope of the invention.

Figure 2:
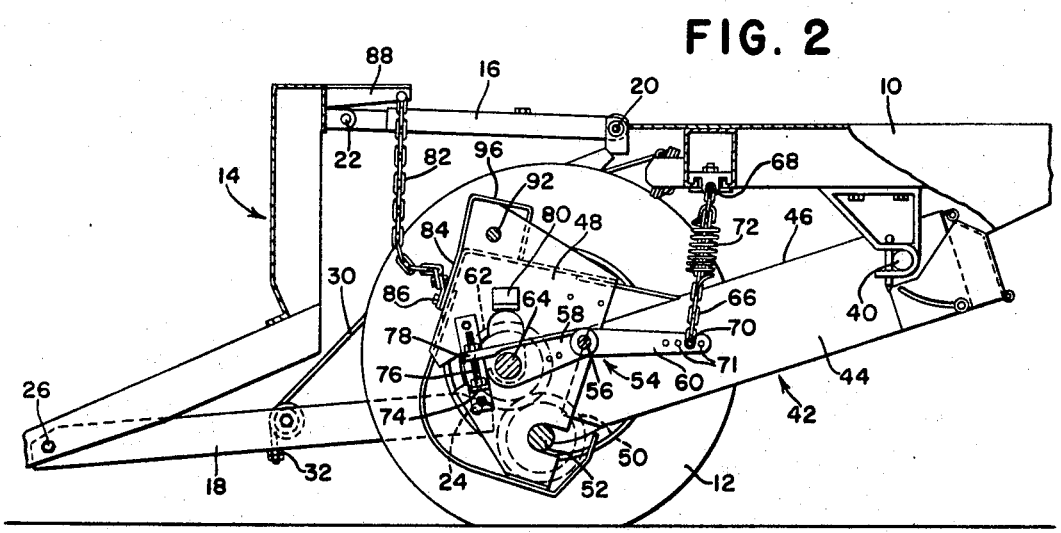
FIG. 2 is a sectional side elevation view of the crop conditioner mounted on a windrower, showing the crop conditioner in operating position, only a fragmentary, partly sectional portion of the windrower being shown.

In the operating position, as shown in FIG. 2, the crop conditioner is supported by a pair of chains 66, each chain having one end 68 connected to the frame 10 and its opposite end respectively connected to a rear bell crank arm 60 by means of a fastener 70, attachable at alternate points 71 along the bell crank arm 60. The weight of the crop conditioner exerts a downward force on the bell cranks 54 at the pivots 56, and since the downward movement of the rear bell crank arm 60 is limited by the chains 66, the weight of the crop conditioner creates a counterclockwise torque (FIGS. 2 and 3) on the bell cranks 54, which urges the upper or movable roll 62 against the fixed roll 50, providing the necessary crushing pressure between the rolls. The alternate mounting points 71 on the rear bell crank arm 60 provide a means for varying the lever arm between the pivot 56 and the point of attachment of the chains 66 whereby the torque and consequently the crushing pressure on the conditioner rolls may be varied.

A tension spring 72 is mounted in parallel with each chain 66, the opposite ends of each spring 72 being connected to the respective chain 66 so that the undeflected length of the spring 72 is less than the extended length of the chain 66 between the attachment points. The springs 72 exert a lesser force than the weight of the crop conditioner, so that, when the crop conditioner is supported by the chains 66, the springs 72 are fully extended and exert a force tending to raise the crop conditioner to assist the raising of the conditioner if it strikes an obstruction.

The movement of the movable roll 62 toward the fixed roll 50 is limited by a stop means 74 projecting from the side panel 48 and engaging the forward bell crank arm 58 via a bolt 76 threaded through a flange 78 on the arm, the extension of the bolt 76 being adjustable to vary the clearance between the rolls 50 and 62. The movement of the roll 62 away from the roll 50 is also limited by an upper stop 80 which is mounted on the side panel 48 and engageable with the forward bell crank arm 58.

Figure 3:
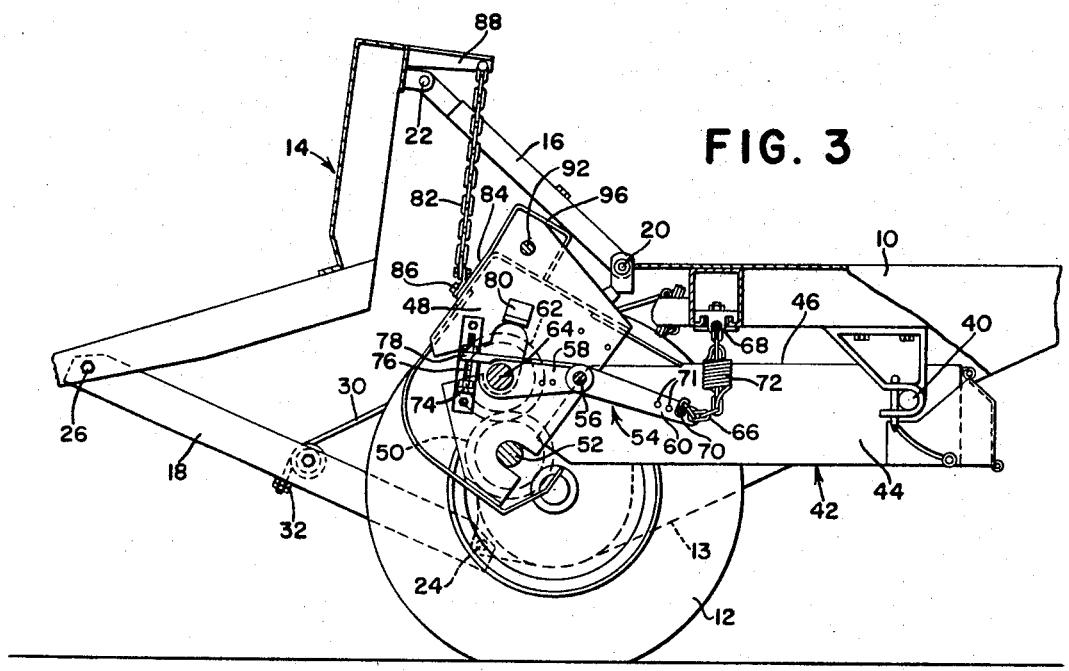
FIG. 3 is a view similar to FIG. 2 but showing the crop conditioner in a raised or transport position on the windrower.

The weight of the crop conditioner normally maintains it in its lower or operating position as shown in FIG. 2. However, the crop conditioner is also connected to the platform 14 by means of a pair of chains 82 connected at 86 to a front conditioner frame panel 84 and to the platform 14 via rearwardly projecting brackets 88. When the platform 14 is in its lower or operating position as shown in FIG. 2, the chains 82 are slack and the crop conditioner is supported by the chains 66. The chains 82 provide a lost motion connection between the platform and the crop conditioner whereby the platflorm 14 may be partially raised without moving the crop conditioner. When the platform 14 is raised a sufficient distance so that the chains 82 are fully extended, additional raising of the platform 14 will also raise the crop conditioner as shown in FIG. 3.

The fixed or lower roll 50 is rotated with its upper surface moving rearwardly, and the meshing upper or movable roll 62 is rotated with its lower surface moving rearwardly by a drive means indicated generally by the numeral 90. The drive means 90 includes a drive shaft 92, connected to the windrower power source and to a driven sprocket 94 rotating under a drive shield 96. A sprocket 98 on the fixed roll shaft 52 is connected to and driven by the drive sprocket 94 by a chain 100, which also rotates an intermediate drive show 102, carrying a pair of coaxial sprockets 104. The movable roll 62 carries a sprocket 106 which is connected to and driven by the intermediate drive shaft sprocket 104 by means of a chain 108.

In operation, if the windrower operator desires to condition his crop during the windrowing operation, the crop conditioner attachment is easily mounted on the windrower by securing the pivot 40 to the windrower frame 10 and connecting the chains 82 to the platform 14 and the chains 66 to the frame 10 at 68. The crop conditioner is thus positioned immediately behind the discharge area of the windrower platform whereby crops dropping through the discharge area onto the ground are immediately picked up by the lower conditioner roll 50 and passed between the rolls 50 and 62, crushing or crimping the stems of the crop according to the type of roll being utilized. As previously described, the weight of the conditioner is transfitted to the conditioner roll 62 to provide the necessary crushing pressure. If a slug of material is encountered, the slug will separate the rolls a sufficient distance to permit the slug to pass, the separation of the rolls simultaneously raising the entire conditioner a relatively short distance via the bell cranks 54 and the pivots 56. The cutting height of the platform 14 may be varied to a degree without affecting the position of the crop conditioner, as previously described, and when the cutting platform 14 is elevated to its transport position, as shown in FIG. 3, the crop conditioner is also automatically elevated to its transport position.

Other features and advantages of the present invention will readily occur to those skilled in the art, as will many modifications and alterations in the preferred embodiment of the invention described herein, all of which may be achieved without departing from the spirit and the scope of the invention.

What is claimed is:

1. In a windrower having a mobile frame adapted to advance over a field and including a main frame portion and a platform portion suspended from the main frame portion for vertical swinging movement between a lowered operative position and a raised position and having a crop discharge area, and suspension control means operatively interconnecting the main frame portion and the platform portion for shifting the platform portion between its alternate positions, the combination therewith of a crop conditioner attachment comprising a crop conditioner frame; means mounting the crop conditioner frame on one of said portions for vertical adjustment relative to the ground; a first transverse conditioner roll journaled on the crop conditioner frame rearwardly of the crop discharge area; a lever means pivotally mounted on the crop conditioner frame for swinging about a transverse axis; a second transverse conditioner roll journaled on said lever means offset from the lever means pivot axis and closely paralleling the first roll; and connecting means operatively interconnecting the lever means offset from the lever means pivot axis and one of said frame portions for supporting the crop conditioner frame above the ground, the weight of the crop conditioner supported through said lever means tending to rotate said lever means about its axis in a direction which causes the second roll to move toward the first roll, whereby the weight of the crop conditioner biases the second roll toward the first roll.

2. The invention defined in claim 1 wherein the means mounting the crop conditioner frame on said frame portion for vertical adjustment relative to the ground includes a transverse pivot means on the main frame portion rearwardly of the crop discharge area, the crop conditioner frame being adjustable in a vertical arc about said transverse pivot means.

3. The invention defined in claim 1 and including spring means operably connected to the main frame portion and said lever means for partially counterbalancing the weight of said crop conditioner.

4. The invention defined in claim 1 wherein the lever means includes a pair of bell cranks respectively mounted on said conditioner frame adjacent the opposite ends of said second roll and having a common transverse axis, one arm of each bell crank journaling said second roll and the other arm being connected to said connecting means.

5. The invention defined in claim 1 and including stop means mounted on said conditioner frame and operably engaging said lever means to support the second roll a predetermined distance from the first roll.

6. The invention defined in claim 5 wherein the transverse pivot means on the main frame portion about which the crop conditioner swings is rearwardly of said conditioner rolls.

7. The invention defined in claim 6 and including spring means operably connected to the main frame portion and said lever means for partially counterbalancing the weight of said crop conditioners.

8. The invention defined in claim 5 wherein the connecting means comprises a pair of flexible elements respectively connecting said bell cranks to said main frame portion.

9. The invention defined in claim 8 and including at least one flexible element operably interconnecting said platform portion and said crop conditioner frame for accommodating limited vertical movement of said platform portion from its lower position to an intermediate position without moving said crop conditioner frame and providing vertical movement of said crop conditioner frame with said platform portion between said intermediate position and the raised platform portion position.

References Cited

UNITED STATES PATENTS

| 2,989,829 | 6/1961 | Heth et al. | 56—1 |
| 3,007,297 | 11/1961 | Halls et al. | 56—1 |
| 3,128,586 | 4/1964 | Johnston | 56—1 |
| 3,175,343 | 3/1965 | Johnston et al. | 56—1 |

LUCIE H. LAUDENSLAGER, *Primary Examiner.*

PO-1050
(5/69)

UNITED STATES PATENT OFFICE
CERTIFICATE OF CORRECTION

Patent No. 3,422,606     Dated  21 January 1969

Inventor(s)     William R. Wood

It is certified that error appears in the above-identified patent and that said Letters Patent are hereby corrected as shown below:

Column 4, lines 56, 60, and 66, the claim reference numeral "1", each occurrence, should read -- 2 --. Column 5, line 3, change "conditioners" to -- conditioner --.

SIGNED AND
SEALED

OCT 21 1969

(SEAL)
Attest:

Edward M. Fletcher, Jr.
Attesting Officer

WILLIAM E. SCHUYLER, JR.
Commissioner of Patents